United States Patent [19]

Fritzsche et al.

[11] 4,323,454
[45] Apr. 6, 1982

[54] TUBE SHEETS FOR PERMEATORS

[75] Inventors: Alfred K. Fritzsche, Cary; Harry P. Holladay; Maurice L. Woodcock, both of Raleigh, all of N.C.

[73] Assignee: Monsanto Company, St. Louis, Mo.

[21] Appl. No.: 209,807

[22] Filed: Nov. 25, 1980

Related U.S. Application Data

[63] Continuation-in-part of Ser. No. 109,425, Jan. 3, 1980, abandoned.

[51] Int. Cl.$^3$ .................. B01D 31/00; B01D 13/00; B29C 6/04; B29F 1/10
[52] U.S. Cl. .................. 210/321.1; 55/158; 210/321.3; 264/261; 264/263; 264/271.1; 264/328.14
[58] Field of Search .............. 528/94, 111; 428/292, 428/376, 398, 413; 210/321.1, 321.2, 321.3, 321.4, 321.5; 55/158

[56] References Cited

U.S. PATENT DOCUMENTS

| | | | |
|---|---|---|---|
| 2,956,039 | 10/1960 | Novak et al. | 260/37 EP |
| 3,018,260 | 1/1962 | Creighton, Jr. | 260/18 EP |
| 3,043,796 | 7/1962 | Novak et al. | 260/37 EP |
| 3,228,876 | 1/1966 | Mahon | 210/321.3 |
| 3,329,652 | 7/1967 | Christie | 528/94 |
| 3,339,633 | 9/1967 | Richardson | 166/295 |
| 3,422,008 | 1/1969 | McLain | 210/321.5 |
| 3,499,062 | 3/1970 | Geary, Jr. et al. | 264/36 |
| 3,507,831 | 4/1970 | Avis et al. | 528/94 |
| 3,610,418 | 10/1971 | Calderwood | 210/321 |
| 3,643,805 | 2/1972 | Hoffman | 210/321 |
| 3,728,425 | 4/1973 | Schrader | 264/49 |
| 3,760,949 | 9/1973 | Carey et al. | 210/321.1 |
| 3,773,181 | 11/1973 | Calderwood et al. | 210/321 |
| 3,989,673 | 11/1976 | Jenkins et al. | 428/444 |
| 4,049,765 | 9/1977 | Yamazaki | 264/261 |
| 4,069,203 | 1/1978 | Carey et al. | 528/94 |
| 4,138,460 | 2/1979 | Tigner et al. | 264/159 |
| 4,170,559 | 10/1979 | Kroplinski et al. | 210/321 |

OTHER PUBLICATIONS

Chemical Week, New Cure for Epoxies, Jul. 31, 1965, pp. 47 and 48.
Farkas et al., "Imidazole Catalysis in the Curing of Epoxy Resins", Jour. Applied Polymer Sci., (1968), vol. 12, pp. 159–168.
Fike Chem. Co., Sales Brochure, "EMI-24 Curing Agent for Epoxy Resin Systems".
Glandt et al., "Cure & Transitions of an Imidazole/Epoxy System", Polymer Preprints ACS, Polymer Chem., (1975), pp. 694–700.
Harding et al., "Mech. Prop. of Epoxy Castings & Compositions Cured with Ethyl Methyl Imidazole", Preprints ACS, Org. Coatings & Plas. Chem., (1964), 24 (2) 309–317.
Shell Chem. Co., "EPON Resins for Casting", pp. 66–70.
Shimp, Tech. Bull. 1667, "Non-Fibrous Fillers for Epoxy Resin Formulations", Celanese Resins, (1967).
Ventrice, "Eval. of 2-Ethyl-4-Methylimidazole as an Epoxy Resin Hardner", Div. Org. Coating & Plastic Chem., (1966), 26 (2) 134–143.

*Primary Examiner*—William J. Van Balen
*Attorney, Agent, or Firm*—Thomas E. Kelley; Howard C. Stanley

[57] ABSTRACT

Tube sheets having a plurality of hollow fiber membranes suitable for fluid separations which are adapted to be provided in a fluid tight relationship within a permeator comprise a cured, solidified resinous composition of a liquid resinous composition comprising polyglycidyl resin-containing resin, curing agent and particulate filler. Methods are provided for making tube sheets.

71 Claims, No Drawings

TUBE SHEETS FOR PERMEATORS

This is a continuation-in-part of United States patent application Ser. No. 109,425, filed Jan. 3, 1980, now abandoned, incorporated herein by reference.

This invention relates to permeators containing hollow fiber membranes and more particularly to permeators having tube sheets prepared from a liquid resinous composition containing a polyglycidyl resin and a finely-divided filler.

Permeators containing hollow fiber membranes are often advantageous in view of the high ratio of membrane surface area per unit volume of permeator which can be achieved. Consequently, permeators containing hollow fiber membranes may be sufficiently compact to find desirable application for many fluid separation operations such as gas-gas, gas-liquid, and liquid-liquid (including liquid-dissolved solids) separations.

In these permeators, at least one end of each of the hollow fiber membranes is embedded (often commonly referred to as potted) in a tube sheet and the bores of the hollow fiber membranes extend in a fluid communication relationship through the tube sheet. One purpose of the tube sheet is to secure the hollow fiber membranes in an essentially fluid tight relationship within the tube sheet. The tube sheet may be secured in an essentially fluid tight relationship in the permeator such that fluid does not pass between one of the exterior side and bore side to the other side of a hollow fiber membrane except through the wall of the membrane. Even small leakages around the tube sheet can significantly adversely effect the performance of the permeator since non-permeating moieties can pass via these leakages to the permeate exit side of the hollow fiber membranes and reduce the selectivity of separation which can be achieved by the permeator. Another purpose of the tube sheet is to provide a sufficiently strong barrier to fluid flow such that during operating conditions, the tube sheet does not rupture or otherwise lose its integrity such that fluid can pass through the tube sheet. Therefore, the tube sheet is most often of substantial thickness in order to ensure achieving a fluid tight relationship with the hollow fiber membranes and to ensure that the tube sheet can withstand any pressure differentials to which it may be subjected during an intended separation operation.

Generally, tube sheets are fabricated using a liquid resinous composition, wherein the resin may be a natural or synthetic resin, which either can be applied to the hollow fiber membranes which are then assembled into a bundle or can be cast around a previously assembled bundle of the hollow fiber membranes as a liquid and then solidified, e.g., by curing. Many unique considerations exist in the selection of a liquid resinous composition suitable for forming tube sheets. For instance, it is usually desired that:

1. The resin, before and after solidification, sufficiently adhere to the hollow fiber membrane that the desired fluid tight relationship between the tube sheet and the hollow fiber membranes can be achieved;
2. The solidified resin exhibit sufficient strength and integrity to withstand the pressure differentials which are expected to exist across the tube sheet during intended separation operations;
3. The liquid resinous composition exhibit little shrinkage during solidifying such that undue internal stresses within the tube sheet do not occur and the solidified resin does not separate from the hollow fiber membranes or result in stresses on the hollow fiber membranes which adversely affect the integrity of the hollow fiber membranes;
4. The liquid resinous composition not unduly dissolve or otherwise adversely affect the material of the hollow fiber membranes;
5. The tube sheet exhibit a relative absence of internal stresses such as may be caused by differentials in temperature during solidifying, especially curing, the liquid resinous composition. (The propensity for such internal stresses to occur is increased in tube sheets having at least one region which does not contain hollow fiber membranes and hence may have different heat generation, heat absorption or heat transfer characteristics and, possibly, different thermal expansion characteristics than a region containing hollow fiber membranes);
6. Especially with liquid resinous composition containing resins which polymerize (cure) during or after solidification, any heat evolved during the polymerization should not produce temperatures in the tube sheet which adversely affect the hollow fiber membranes and any heat required to initiate or to achieve a desired level of polymerization should not adversely affect the hollow fiber membranes;
7. Especially when the tube sheet is cast around a previously assembled bundle of hollow fiber membranes, the viscosity of the liquid resinous composition be sufficiently low that penetration of the liquid throughout the bundle can be readily achieved;
8. The liquid resinous composition not be unduly drawn up between the hollow fiber membranes by capillary action (hereafter referred to as "wicking") and any wicking which may occur be relatively uniform across the cross-section of the bundle of hollow fiber membranes;
9. The tube sheet exhibit sufficient chemical resistance such that it maintains adequate strength and dimensional stability during intended separation operations;
10. The fabrication of the tube sheet be relatively non-complex and avoid the necessity to utilize complex equipment, and be capable of being fabricated with minimal fabrication residence time and with minimal manpower training, skill and time;
11. The solidified liquid resinous composition be capable of being severed or shaped to, e.g., expose the bores of the hollow fiber membranes or adapt the tube sheet for assembly of the permeator; and
12. The components of the liquid resinous composition not provide any undue toxicity risk during the formulation of the liquid resin, during the preparation of the tube sheet or after the preparation of the tube sheet.

A wide variety of resins have been proposed for preparing tube sheets for hollow fiber membranes. For instance, Geary, et al., in U.S. Pat. No. 3,499,062, issued Mar. 3, 1970, suggest the use of solders, cements, waxes, adhesives, natural and synthetic resins. McLain in U.S. Pat. No. 3,422,008, issued Jan. 14, 1969, disclose the use of epoxy resins for forming tube sheets and suggest that phenol-aldehyde resins, melamine-aldehyde resins, thermosetting artificial rubbers, and acrylic resins may also be suitable. Other materials which have been disclosed for use in materials for forming tube sheets include urethane resins, silicone resins, polysulfide, acetals, cellulosics, fluorocarbons, vinyls, styrenes, polyethylene, and polypropylene. See, for instance, U.S. Pat. Nos. 3,760,949, issued Sept. 25, 1973; 4,049,765, issued Sept. 20, 1977; and 4,138,460, issued Feb. 6, 1979.

One of the more preferred classes of resins for forming tube sheets is the epoxy resins. For example, Schrader in U.S. Pat. No. 3,728,425, issued Apr. 17, 1973, discloses the use of polyepoxides for fabricating tube sheets for permeators. He suggests that the polyepoxides include glycidyl polyethers of polyhydric phenols such as resorcinol, catechol, hydroquinone, phloroglucinol, 2,2-bis(4-hydroxyphenyl)propane (bisphenol A), 4,4'-dihydroxybenzophenone, 1,1-bis(4-hydroxyphenyl) ethane, bis(2-hydroxynaphthyl) methane, 2,2-bis(4-hydroxyphenyl)butane, 4,4'-dihydroxyphenyl phenylsulfone, and condensation products of phenolformaldehyde (to produce novolac resins). Most commonly, the epoxy resin specifically disclosed by Schrader comprises a diglycidyl ether of bisphenol A (hereafter DGEBA). Schrader's resinous composition also contains an aromatic amine as a curing agent and a small amount, specifically about 0.5 to 5 parts per hundred parts of resin, of a thixotropic agent apparently to reduce wicking while still permitting penetration of the resinous composition into a bundle of fibers. Schrader states that colloidal silica (Cab-O-Sil) is a useful thixotropic agent and suggests that a variety of other thixotropic agents such as clays, organic modified clays, organic modified silicas, and chemical derivatives of castor oil, may be used. Schrader also states that coupling agents, reactive diluents, plasticizers, bond promoting agents, and cure accelerators may be optional ingredients.

Although various proposals have been made suggesting materials for tube sheets for permeators containing hollow fiber membranes, in many instances, the materials may lack one or more of the desired desires properties such as chemical resistance, freedom from internal stresses, ease of fabrication, freedom from undue risk of toxicity, freedom from excessively high curing temperatures, etc. Generally, the performance demanded of a tube sheet will depend upon the anticipated operating conditions of the permeator. Permeators containing hollow fiber membranes have found acceptance for use in desalination, ultrafiltration, and hemodialysis. In general, these separation operations provide relatively mild environments, i.e., the processed streams contain little, if any, concentrations of moieties which may adversely affect the material of the tube sheet (e.g., by loss of physical strength or integrity or by swelling). Moreover, in operations such as hemodialysis in which little if any pressure differential is exerted across the tube sheet, the strength of the tube sheet is not a prime consideration. Accordingly, a wider freedom of choice exists in selecting the liquid resinous composition for fabricating the tube sheet. For example, the aspects of strength and chemical resistance can be sacrificed to avoid high temperatures generated or supplied during curing, to provide a desirably fluid liquid resinous composition for penetration into a previously assembled bundle of hollow fiber membranes, and to ensure good adherence of the tube sheet to the hollow fiber membranes. Even with such permeators which operate under relatively mild conditions, considerable difficulty may still be experienced in obtaining a suitable liquid resinous composition for forming a tube sheet. These difficulties clearly become more severe when the tube sheet must exhibit high strength and high chemical resistance.

One of the problems which has been particularly troublesome in the fabrication of tube sheets, particularly tube sheets which exhibit high strengths and chemical resistance, are the peak temperatures which may be produced during the curing of a liquid resinous composition due to the exothermic curing reactions. For example, permeators which are of sufficiently large size to be attractive for, e.g., gas-gas separations, may have tube sheets which require at least 0.5, say, at least 1, kilogram of liquid resinous composition. In view of the generally poor thermoconductivity of these resins and the highly exothermic nature of their curing reactions, these large quantities of liquid resinous composition can generate sufficiently high temperatures that damage may occur to the hollow fiber membranes and thermal stresses can occur between, say, a zone containing hollow fiber membranes and a zone having an absence of hollow fiber membranes.

One approach which may be taken to avoid the generation of these high temperatures is to fabricate the tube sheet by, e.g., a series of successive castings of the liquid resinous composition with each casting being solidified prior to the subsequent casting being effected. Since each casting is of less volume than the total amount required to fabricate the tube sheet, the peak temperature generated in each casting may be reduced. However, the interface between each casting may pose structural weaknesses, and considerable additional time may be required to effect a plurality of castings to fabricate a tube sheet as compared to the time required in fabricating a tube sheet with a single casting. Another approach may be to cool the liquid resinous composition during curing, e.g., by using a mold capable of being cooled during the curing of the resin or by passing a cooling fluid through the hollow fiber membranes during the curing of the resin. This approach may therefore require some complex equipment and procedures. Moreover, since the liquid resinous compositions usually exhibit poor heat transfer characteristics, the cooling may exaggerate any differentials in temperature in the liquid resinous composition during curing and therefore present a risk of undue thermal stresses within the tube sheet, and the cooler regions of the tube sheet during curing may not achieve the desired degree of cross-linking. Furthermore, if the tube sheet is maintained at these cooler temperatures, the time required to achieve the desired degree of curing may be too great to be commercially attractive.

Fillers have found general application in epoxy resin formulations to reduce shrinkage, improve thermal shock resistance, dissipate heat, impart flame retardancy and lower costs. See, for instance, Shimp, "Non-Fibrous Fillers for Epoxy Resins", Technical Bulletin 1667 published by Celanese Coatings Company in 1967. Creighton, Jr., in U.S. Pat. No. 3,018,260, issued Jan. 23, 1962, suggests epoxy resin formulations for fabricating articles such as screws, tools, jigs, dies, molds, molded articles, models, and work holders. The patentees formulations contain finely divided metal particles (e.g., steel) in a volumetric ratio of 32 to 90 percent metal to 68 to 10 percent resin. One of the functions of the metal particles is described at column 2, lines 21 to 29:

"The polymerization of the resin results in an exothermic reaction which ordinarily is deleterious in relatively thick articles because the resin itself is a poor conductor of heat. The metal particles, however, in the high proportion as employed herein serve as conductors of the heat from the internal portions of the mass to the surface thereof, thus avoiding the harmful effects of the heat of polymerization."

Fillers, however, are generally recognized to increase the viscosity of a liquid resinous composition. Moreover, if the viscosity of the liquid resinous composition is not sufficiently high, the fillers may settle, even during curing. Hence, a loss of uniformity in curing and in temperatures generated during curing may exist.

Considerable amounts of research have been conducted and much literature has been published on general epoxy technology. See, for instance, Lee and Neville, Handbook of Epoxy Resins, 1967, "Epoxy Resins", Encyclopedia of Polymer Science and Technology, Volume 6, pages 209 to 271 (1967), and May and Tanaka, Epoxy Resins-Chemistry and Technology, 1973. Epoxy resins have found widespread applications in coatings, bonding, electrical encapsulating, tooling, flooring, castings, and the like. Various of these applications may require that the epoxy exhibit different properties, e.g., in terms of strength, ease of processing, time for curing, heat distortion resistance, and the like. Accordingly, many different epoxy resins and curing agents are commercially available in order to meet the specific needs for a particular application. Although general properties and effects can be attributed to various epoxy resins, one seeking suitable epoxy for a particular application may still need to exercise ingenuity, and this is particularly the case with respect to selecting materials for tube sheets in which highly sensitive hollow fiber membranes may be employed and high strength and high chemical resistance may be required.

In accordance with this invention, permeators containing hollow fiber membranes are provided which have tube sheets which contain a cured, solid resin and filler. By this invention the tube sheets containing fillers can be readily and easily fabricated, including fabrication techniques comprising casting a liquid resinous composition around a previously assembled bundle of hollow fiber membranes. Moreover, the filler can be utilized without undue adverse effect on penetration of the liquid resinous composition among hollow fiber membranes or on wicking. Advantageously in accordance with this invention, the tube sheet can be prepared in a single casting to minimize the time required for fabricating the tube sheet, and the resin cured without using complex equipment at suitable temperature to minimize curing time and maximize a uniform degree of curing throughout the tube sheet with an essential freedom from internal stresses.

The tube sheets of the permeators of this invention comprise a cured, solidified resinous composition of a liquid resinous composition containing resin containing a major amount by weight of polyglycidyl resin, a curing agent composition, and a finely divided filler. In accordance with this invention, the resin exhibits a viscosity of about 500 to 12,000 centipoises at room temperature and the polyglycidyl resin has a viscosity of about 1000 to 30,000 centipoises at 25° C. The liquid resinous composition often exhibits a viscosity of about 1000 to 10,000 at 25° C. All viscosities herein are Brookfield viscosities and are determined at 25° C. unless otherwise indicated. Preferably, the resin contains a major amount by weight of diglycidyl ether having a weight average molecular weight of at least about 300, and a minor amount of diglycidyl ether having a weight average molecular weight less than about 250.

In a preferred aspect of the invention, the curing agent composition contains at least two curing agents, a viscosity increasing agent and a solidifying agent. The viscosity increasing agent reacts quickly with glycidyl groups contained in the resin and is provided in an amount sufficient to increase the viscosity of the liquid resinous composition such that the tendency of the filler to settle from the liquid resinous composition is reduced, but the viscosity increasing agent is in an amount insufficient to unduly increase the temperature of the liquid resinous composition by the exothermic curing reactions. The solidifying agent reacts more slowly with the glycidyl groups of the resin than does the viscosity increasing agent. Accordingly, the period of time over which curing of the resin occurs can be extended such that the heat generated during the exothermic curing can be gradually dissipated and thus the temperature throughout the tube sheet during the curing can be relatively uniform in order to ensure a relatively uniform degree of curing throughout the tube sheet. Moreover, by allowing the heat produced by the exothermic curing reactions to be dissipated, excessively high temperatures during curing the resin can be avoided.

In accordance with the invention fillers which may find use in providing the tube sheets in accordance with this invention may be composed of a wide variety of solid materials. Frequently, suitable fillers have densities about 1 to 10, preferably, about 2 to 8, say, about 2 to 5, grams per cubic centimeter at 25° C. Examples of fillers are inorganic fillers, organic-modified, inorganic fillers, and organic fillers. Illustrative inorganic fillers are silica-type materials such as silica, aluminum silicates (clays feldspar, mica, etc.), sodium silicate, sodium borosilicate, talc, wollastonite; metals and metal oxides such as aluminum, aluminum oxide, iron, iron oxide, steel, copper, copper oxide, calcium oxide, titanium dioxide, zinc, etc.; inorganic salts such as barium sulfate, calcium carbonate, titanium sulfate, etc.; and the like. Illustrative organic-modified, inorganic fillers include inorganic fillers such as described above with organic-containing coupling agents. Usually the coupling occurs through di- and tri-functional atoms such as oxygen, sulfur, and nitrogen atoms, which are part of an organic moiety which may be alkyl, alkenyl, aryl (including alkaryl), or heterocyclic (with the heteroatoms usually being at least one of nitrogen, oxygen, or sulfur). Frequently, the organic moiety contains 1 to about 50 carbon atoms, e.g., about 1 to 20 carbon atoms. Silane moieties may also be useful and may contain 1 to about 20 or 30 silicon atoms. The organic moieties and silane moieties may contain functional groups such as amino, glycidyl, mercapto, hydroxyl, acrylic, methacrylic, etc., groups. Also, the coupling linkage may be, e.g., an ether or amine linkage or may through a phosphito, pyrophosphato, phosphato, carboxyl, sulfonyl, amide, etc., linkage. Coupling agents may frequently include glycols, glycerine, triethanolamine, glycidyltrialkoxysilanes, vinylsilane, dialkylphosphite, dialkylphosphite, etc. The organic fillers usually are solid resins, preferably thermoset resins such as phenolics, epoxies, etc.

The filler is preferably particulate as opposed to fibrous, in order to minimize the effect of the filler on the viscosity of the liquid resinous composition and thus enable the liquid resinous composition to penetrate between the hollow fiber membranes. Frequently, average particle size, particle size distribution and ratio of surface area per unit volume of the filler contribute to the effect of the filler on the rheological properties of the liquid resinous composition. In many instances, the average maximum particle cross-sectional dimension is less than about 200 microns, e.g., about 1.5 to 150 microns, and most often about 2 to 100, say, about 2 to 50, microns. In some instances, the average maximum particle dimension is about 2 to 30 microns. Usually the filler has a substantial absence, e.g., less than about 5 weight percent based on the total weight of the filler, of particles less than about 1 micron in maximum particle cross-sectional dimension. Preferably, the filler does not have an unduly high surface area such that the viscosity of the liquid resinous composition is sufficiently low to enable penetration between hollow fiber membranes. Generally, the surface area to weight ratio of fillers which may find utility in preparing the tube sheets of this invention is less than about 5, say, less than about 3, e.g., about 0.01 or 0.05 to 2.5, say, about 0.1 to 2 or 2.5, square meters per gram. The surface area of a filler may be determined by any suitable technique such as the conventional Brunauer, Emmett and Teller (BET) adsorption analytical technique for determining surface areas. Frequently, the aspect ratio of the fillers based on the gross dimensions of the particulate fillers is about 1:1 to 50:1, and sometimes, about 1:1 to 20:1.

The amount of filler employed is at least sufficient to reduce the peak temperature generated during the curing of the resin. The filler may reduce the peak temperature generated during the curing of the resin by (1) reducing the amount of resin required to make the tube sheet, and thus less glycidyl groups are available for reaction to produce heat, (2) providing mass to absorb heat produced by the exothermic curing reactions, and (3) assisting in the transfer of heat within the tube sheet. Often the filler comprises at least about 5, preferably at least about 10 or 15, volume percent of the liquid resinous composition. Desirably, the amount of filler is less than about 35, preferably less than about 30, volume percent of the liquid resinous composition in order to ensure adequate penetration of the liquid resinous composition between the hollow fiber membranes. Most frequently, the filler comprises about 15 to 25 volume percent of the liquid resinous composition.

The resin often comprises at least about 30, and often at least about 40, weight percent of the liquid resinous composition. Excluding the filler, the resin may comprise about 60 to 95, say, about 85 to 95, weight percent of the liquid resinous composition. The viscosity of the resin may be about 500 to 12,000 centipoises at 25° C., and most frequently, the viscosity is about 2000 to 10,000 centipoises at 25° C.

The resin contains a major amount by weight of a polyglycidyl resin. The polyglycidyl resin contains one or more diglycidyl compounds (including diglycidyl-terminated prepolymers). If desired, the polyglycidyl resin may also contain tri- or higher functionality glycidyl compounds. The triglycidyl and higher functionality compounds (e.g., novolacs) are generally not required to provide advantageous strength and chemical resistance to the tube sheets since the imidazole curing agent often provides adequate cross-linking to achieve the desired properties. However, when employed, the triglycidyl and higher functionality compounds frequently comprise less than about 10, e.g., less than about 5, say, about 0.01 to 2, percent by weight of the polyglycidyl resin. Usually, the diglycidyl compounds comprise at least about 75, say, about 90 or 95 to essentially 100, percent by weight of the resin. The viscosity of the polyglycidyl resin may often be about 1000 to 30,000, say, about 4,000 to 25,000, centipoises, and many attractive polyglycidyl resins have viscosities of about 5,000 to 15,000 or 20,000 centipoises at 25° C.

The polyglycidyl resins useful in providing the tube sheets of this invention are often obtained as the glycidyl product of a reaction between a glycidyl group-forming compound, for instance an epihalohydrin, such as epichlorohydrin and an organic compound. Illustrative of such glycidyl product reactions, for instance, are those involving epichlorohydrin which occur in two steps: (1) the formation of a chlorohydrin intermediate and (2) the dehydrohalogenation of the intermediate to the glycidyl compound. Such reactions are generally described in the literature of the epoxy art; see, for instance, Lee and Neville, *Handbook of Epoxy Resins*, 1967.

The polyglycidyl resins can be generally characterized by the presence of a plurality of glycidyl groups of the following general structure:

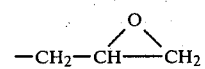

The organic compounds forming the polyglycidyl resin may be aliphatic hydrocarbons, may contain aromatic hydrocarbon groups or may even have a heterocyclic ring structure. The organic compounds may be characterized as having active-hydrogen groups, for instance, alcohol or amine groups, where the hydrogen is replaced by the glycidyl group. Such active-hydrogen alcohol and/or amine groups may even be present in a heterocyclic configuration, for instance, as a triazine or hydantoin.

Among the more preferred polyglycidyl resins useful in providing the tube sheets of this invention are any of those polyglycidyl resins comprising the glycidyl reaction product of a glycidyl-forming compound, such as epichlorohydrin, with any of the compounds selected from among bisphenol A, resorcinol, catechol, hydroquinone, phloroglucinol, 4,4'-dihydroxybenzophenone, 1,1-bis(4-hydroxyphenyl)ethane, bis(2-hydroxynaphthyl)methane, 2,2-bis(4-hydroxyphenyl)butane, 4,4'-dihydroxydiphenyl sulfone, ethylene glycol, propylene glycol, butanediol, pentanediol, isopentanediol, linoleic dimer acid, poly(oxypropylene)glycol, 2,4,4'-trihydroxybisphenyl, 2,2',4,4'-tetrahydroxybisphenyl, bisresorcinol F, 2,2',4,4'-tetrahydroxybenzophenone, bisphenol-hexafluoroacetone, aniline, para-aminophenol, isocyanuric acid, hydantoin, 1,1',2,2'-tetra(p-hydroxyphenyl)ethane, phenol-formaldehyde novolac, o-cresol-formaldehyde novolac, cycloaliphatic alcohols and mixtures thereof. These reactant compounds may be substituted, for instance, with hydroxyl groups or halogen groups, such as fluorine, chlorine and bromine. One such substituted organic compound is tetrabrominated bisphenol A.

More preferably, the polyglycidyl resin comprises the glycidyl reaction product of a glycidyl-forming compound, such as epichlorohydrin, with phenol formaldehyde novolac or bisphenol A. The polyglycidyl resin reaction product based on a phenol formaldehyde novolac is sometimes referred to as a polyglycidyl ether of bisphenol F, as a bisphenol F epoxy resin or a polyglycidyl ether of phenol formaldehyde novolac. Most preferably, the polyglycidyl resin comprises the glycidyl reaction product of bisphenol A and a glycidyl-forming compound. This preferred polyglycidyl resin is commonly referred to as a diglycidyl ether of bisphenol A (DGEBA), or as a bisphenol A epoxy resin, and is generally represented as the mixture of diglycidyl polyethers having the chemical structural formula

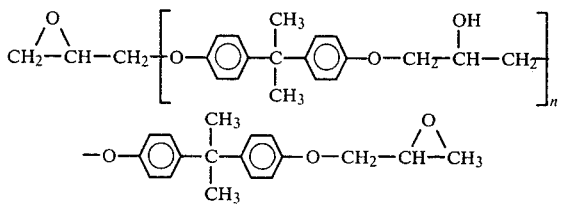

where n is often between 0 and 1, say, between 0.01 and 0.5.

In one aspect of this invention, the polyglycidyl resin contains a major amount of diglycidyl ether having a weight average molecular weight of at least about 300, and a minor amount of diglycidyl ether having a weight average molecular weight of less than about 300, such that the resin has a desired viscosity. Preferably, the higher molecular weight diglycidyl ethers contain aromatic groups in order to provide strength and chemical resistance to the tube sheet. These higher molecular weight diglycidyl ethers, however, often have high viscosities which may be undesirable to achieve penetration between hollow fiber membranes and may be relatively slow in reacting with curing agents. The lower molecular weight diglycidyl ethers generally have lower viscosities than the higher molecular weight diglycidyl ethers, and hence can serve to reduce the viscosity of the resin. Accordingly, they are often referred to as reactive diluents. Advantageously, since the lower molecular weight diglycidyl ethers have two glycidyl groups, they do not tend to terminate polymer chain structure during curing. Therefore, the lower molecular weight diglycidyl ethers do not significantly detract from the strength and chemical resistance of the tube sheet as might a mono-functional glycidyl ether. Moreover, the lower molecular weight diglycidyl ethers may exhibit higher reaction rates with the curing agent in order to promote a desirable increase in viscosity of the liquid resinous composition during the earlier stages of curing such that undue settling of filler does not occur.

By utilizing at least two diglycidyl ethers of varying molecular weight in the polyglycidyl resin, considerable flexibility is provided in the selection of the diglycidyl ethers to be employed in preparing the tube sheet. For instance, a diglycidyl ether which may exhibit excellent strength and chemical resistance properties, may be deficient with respect to wicking, viscosity, or reactivity, can be combined with another diglycidyl ether to ameliorate one or more of these deficiencies without unduly adversely affecting the beneficial properties provided by the first diglycidyl ether. Frequently, the higher molecular weight diglycidyl ethers have weight average molecular weights of about 300 to 500 or 600, say, about 300 to 400, preferably about 330 to 390, and viscosities of about 4,000 to 20,000 or 30,000 centipoises at 25° C. A preferred higher molecular weight diglycidyl ether is the diglycidyl ether of bisphenol A. Other Other useful higher molecular weight diglycidyl ethers include the diglycidyl ethers of 4,4'-dihydroxybenzophenone, 1,1'-bis(4-hydroxyphenyl)butane, bis(2-hydroxynaphthyl)methane, 2,2'-bis(4-hydroxyphenyl)butane, 4,4'-dihydroxydiphenyl sulfone, linoleic dimer acid, 2,4,4'-trihydroxydiphenyl, 2,2',4,4'-tetrahydroxydiphenyl, bisresorcinol-F, bisphenolhexafluoroacetone, 1,1-bis(4-hydroxyphenyl)ethane, or other similar compounds, for instance those having two terminal hydroxyphenyl groups.

The lower molecular weight diglycidyl ethers frequently have weight average molecular weights less than about 300, e.g., about 210 to 250. Preferably, the lower molecular weight diglycidyl ethers have viscosities of less than about 5,000 centipoises at 25° C., say, about 100 or 500 to 2000 centipoises at 25° C.

Suitable lower molecular weight diglycidyl ethers include alkyl diglycidyl ether where the alkyl group has from 4 to B 10 carbon atoms, for instance butyl, pentyl, neopentyl, 2-methylbutyl, hexyl, decyl, etc.; a phenyl diglycidyl ether; or an alkaryl diglycidyl ether where the alkaryl group has up to 8 carbon atoms. Preferred lower molecular weight diglycidyl ethers are alkyl diglycidyl ethers where the alkyl group has from 4 to 7 carbon atoms, for instance, such as neopentyl diglycidyl ether (also known as neopentyl glycol diglycidyl ether). Preferably, the lower molecular weight diglycidyl ethers have very low vapor pressures to minimize risk of inhalation of evaporated diglycidyl ethers during the preparation of the liquid resinous composition or the fabrication of the tube sheet. Often the lower molecular weight diglycidyl ether is less than about 30, e.g., about 0.5 to 20, say, about 0.5 to 15, weight percent of the polyglycidyl resin.

The resin may also contain a monoglycidyl compound and often commercially-available polyglycidyl resins contain as impurities or as additives, monoglycidyl compounds. Monoglycidyl compounds often serve to reduce the viscosity of the liquid resinous composition and are sometimes referred to as reactive diluents. Since monoglycidyl compounds are reactive with the curing agent, they become incorporated into the cured epoxy structure. The monoglycidyl compounds also serve to terminate the curing reactions, hence, monoglycidyl compounds usually comprise less than about 40, preferably less than about 30, weight percent of the resin. In circumstances in which high strength and chemical resistance of the tube sheet is essential, it is preferred that any monoglycidyl compounds be less than about 10, say, essentially 0 to about 5, percent by weight of the resin. Examples of monoglycidyl compounds are butyl glycidyl ether, pentyl glycidyl ether, phenyl glycidyl ether, glycidyl ether of 2-ethyl-hexanol, etc.

Commonly in the epoxy art, glycidyl resins are characterized in terms of "epoxide equivalent" or "epoxy equivalent weight" which is the weight of the glycidyl resin in grams which contains one gram equivalent of epoxy. Hence, in a diglycidyl compound, the "epoxy equivalent weight" would be one-half the molecular weight of the compound. The epoxy equivalent weight is useful to assist in determining the amount of curing agent to be employed in the liquid resinous composition. Frequently, the resins used in preparing the tube sheets of this invention have "epoxy equivalent weights" of about 75 to 300, say, about 125 to 250, and most often about 150 to 200 grams. Some attractive resins have "epoxy equivalent weights" of about 150 to 180 grams.

The resin of the liquid resinous composition may also contain other polymeric materials which are in the liquid phase in the liquid resinous composition and are solidified when the liquid resinous composition is solidified. These other polymeric materials may include, for instance, phenolic resins, polycarbonate, polysulfones, polyimides, polyamides, etc. These other resins, if used, usually comprise less than about 10 weight percent of the resin.

The liquid resinous composition also contains a curing agent composition. The curing agent composition may comprise one or more compounds which have groups which react with glycidyl groups and can include compounds which, e.g., catalyze the curing reaction. Preferably, the compounds comprising the curing agent composition can consume (either by direct reaction or catalysis) at least about two glycidyl groups per molecule. Hence, the preferred compounds for the curing agent composition are usually at least difunctional; Although monofunctional compounds which promote additional reactions of glycidyl groups can be quite useful. Examples of compounds having at least one functional group reactive with a glycidyl group include polyamines such as isopropyl amine, polymethylenediamines, polyalkyletherdiamines, dialkylenetriamines (e.g., diethylenetriamine), trialkylenetetramines (e.g., triethylenetetramine), diethylaminopropylene, N-aminoethylethanolamine, 1,3-bis(dimethylamino)-2-propanol, methanediamine, aminoethylpiperazine, 1,3-diaminocyclohexane, bis(p-aminocyclohexyl)methane, m-phenylenediamine, m-xylylenediamine, 4,4'-diaminodiphenylmethane, diaminodiphenylsulfone, piperazine, N-methylpiperazine, piperidine, 2,4,6-tris(-dimethylaminomethyl)phenol (DMP-30), tri-2-ethylhexoate salt of DMP-30, modified aliphatic polyamines such as halohydrin ethers of glycol polyamine adducts, dimethamine adducts of alloocimene diepoxide, amino alkoxysilane adducts of propylene oxide, hydroxypolyamines, imidazole curing agents, etc.; acidic curing agents such as boron trifluoride, aluminum chloride, boron trifluoride monoethylamine, maleic anhydride, phthalic anhydride, chlorendic anhydride, pyromellitic dianhydride, benzophenonetetracarboxylic dianhydride, dodecenyl succinic anhydride, nadic methyl anhydride, tetrahydrophthalic anhydride, hexahydrophthalic anhydride, etc.; amides such as amidopolyamines, fatty polyamines, phosphorus amides (e.g., p-phenylene bis(anilinophenylphosphine oxide)); ureas (including substituted ureas and urea-formaldehydes); N,N-diallylmelamine; triallyl cyanurate; hydrazides; amino acetals such as bis(2-dimethylaminoethoxy)methane, bis(1-dimethylamino-2-propoxy)methane, 1,6-bis(2-dimethylaminoethoxy)hexane, α,α'-bis(2-dimethylaminoethoxy)-p-xylene, bis(3-dimethylamino-1-propoxy)methane, 2,6-bis(2-dimethylaminoethoxy) pyridine, 2,6-bis(1-dimethylamino-2-propoxy)pyridine, 2,6-bis(3-dimethylamino-1-propoxy) pyridine, bis(2-dimethylaminoethoxy)methane, bis(2-N-morpholinoethoxy)methane, 1,1-bis(2-dimethylaminoethoxy) propane, 2,2-bis(2-dimethylaminoethoxy)propane, α,α'-bis(2-dimethylaminoethoxy)toluene, 1,1-bis(2-dimethylaminoethoxy)butane, 1,1-bis(2-dimethylaminoethoxy)ethane, and 1,1,2,2-tetrakis(2-dimethylaminoethoxy)ethane; and the like.

One of the preferred groups of compounds for use in curing polyglycidyl resins is imidazole curing agents such as disclosed by A. Zampini in copending U.S. patent application Ser. No. 209,806, filed Nov. 25, 1980 (a continuation in part of U.S. patent application Ser. No. 109,428, filed Jan. 3, 1980, now abandoned) filed concurrently herewith, herein incorporated by reference. The imidazole curing agents which may be useful in preparing the tube sheets of this invention can be represented by the following structural formula

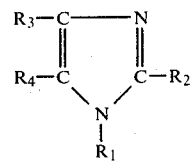

wherein $R_1$, $R_2$, $R_3$ and $R_4$ may be the same or different and are hydrogen, alkyl (e.g., of 1 to about 12 carbons, preferably lower alkyl of 1 to about 4 or 6 carbon atoms), lower acyl (e.g., of 1 to about 4 or 6 carbon atoms), and aryl-containing (e.g., mono and bicyclic aryl and aralkyl of 6 to about 15 carbon atoms). Additionally, $R_2$, $R_3$ and $R_4$ may be halogen (e.g., chlorine, fluorine or bromine), nitro, hydroxy, alkoxy (e.g., alkoxy of 1 to about 6 carbon atoms), or the like. Furthermore, $R_3$ and $R_4$ may be joined, e.g., to form benzimidazole. Each of $R_1$, $R_2$, $R_3$ and $R_4$ may be substituted, e.g., with hydroxyl or halogen moieties, e.g., fluorine, chlorine and bromine. Exemplary of imidazole curing agents are imidazole, N-butylimidazole, 1-acetylimidazole, 1-trifluoroacetylimidazole, 1-perfluorobenzoylimidazole, 1,2-dimethylimidazole, 2-methylimidazole, 2-ethylimidazole, 2-nitroimidazole, 2-ethyl-4-methylimidazole, 2-methyl-5-nitroimidazole, 4-phenylimidazole, 4,5-diphenylimidazole, 4-nitroimidazole, and benzimidazole. Preferably the imidazole curing agent is liquid (including supercooled liquid) at a temperature below about 40° C. or is soluble in the polyglycidyl resin at a temperature below about 40° C., in order to facilitate formulating the liquid resinous composition. Advantageous imidazole curing agents include the substituted imidazoles in which at least one of $R_1$, $R_2$, $R_3$ and $R_4$ is other than hydrogen, e.g., at least one of $R_1$, $R_2$ and $R_3$ is alkyl, acyl, or aryl (including aralkyl). A preferred imidazole curing agent is 2-ethyl-4-methylimidazole. 2-Ethyl-4-methylimidazole (e.g., about 92% pure) is a supercooled liquid at room temperature and has a viscosity of about 4,000 to 6,000 centipoises at room temperature. Imidazole curing agents can provide sufficient working time with the liquid resinous composition, even at slightly elevated temperatures, before the viscosity of the liquid resinous composition begins to significantly increase due to curing in order to facilitate penetration of the liquid resinous composition within a bundle of hollow fiber membranes. Moreover, not only has it been found that imidazole curing agents may provide the low viscosities necessary for achieving this penetration of the liquid resinous composition, but also, the flow properties (rheology) of the liquid resinous composition may be suitable to achieve penetration through the bundle of hollow fiber membranes without the use of enhanced forces such as provided by centrifugal casting. A further advantage is that unduly high peak exotherm temperatures can be avoided since the liquid resinous composition containing the imidazole curing agent may need to be heated, e.g., about 40° C. or higher, to initiate a rapid curing reaction which would tend to develop high temperatures due to the exothermic curing reactions. With a significant portion of the curing occurring at lower temperatures, the ease of maintaining a relatively uniform temperature profile throughout the mass of resinous composition during curing is enhanced. While imidazole curing agents may not eliminate wicking, the amount of wicking is generally not excessive. Moreover, since good penetration of the liquid resinous composition can often be achieved throughout the bundle, the height of wicking across the cross-section of the bundle can be relatively uniform.

A significant advantage of the imidazole curing agents is the ability to vary the extent of any exotherming of the liquid resinous composition during curing by changes in the amount of the imidazole utilized. Imidazole curing agents believed to not only react with epoxy moieties through one or both of the ring nitrogens but also catalyze reactions between (1) an alkoxide ion formed by reaction of the epoxy moiety with a ring nitrogen of the imidazole curing agent and (2) another epoxy moiety. Farkas, et al., in "Imidazole Catalysts in the Curing of Epoxy Resins", *Journal of Applied Polymer Science,* Volume 12, pages 159 to 168 (1968), herein incorporated by reference, provide a more detailed disclosure of the manner in which epoxy moieties are believed to react with imidazole compounds. Accordingly, since the imidazole curing agent can provide two mechanisms for curing an epoxy resin, the relative amount of the imidazole curing agent employed can influence the relative portions of these mechanisms which occur in curing the epoxy resin. For instance, lesser amounts of imidazole curing agent per given amount of epoxy resin would tend to promote more cross-linking through the alkoxide ion route; whereas with greater amounts of imidazole curing agent, more of the epoxy moieties are consumed by reaction with the imidazole nitrogens, and hence less epoxy moieties are available for cross-linking with any alkoxide ions which may be present. The amount of the imidazole curing agent can be chosen in order to provide a peak temperature which can be tolerated by the hollow fiber membranes with sufficient cross-linking to provide advantageous strength and chemical resistance properties to the tube sheet.

In a preferred aspect of the invention, the curing agent composition contains at least two curing agents, a viscosity increasing agent and a solidifying agent which can provide staged curing reactions. The viscosity increasing agent reacts quickly with glycidyl groups in the liquid resinous composition and is provided in an amount sufficient to increase the viscosity of the liquid resinous composition such that the tendency of the filler to settle is reduced. The amount of the viscosity increasing agent, however, is insufficient to unduly increase the temperature of the liquid resinous composition. Frequently, the amount of viscosity increasing agent is sufficient to increase the viscosity of the liquid resinous composition (in the absence of any other curing agents or curing catalysts) to at least about 20,000, e.g., at least about 50,000, centipoises at 25° C. The viscosity increasing agent preferably has a sufficiently high reaction rate that the desired increase in viscosity can be achieved at about 35° C. within about 5 hours, say, about 0.5 to 4, hours. Compounds which may be useful as viscosity increasing agents include compounds which are not excessively reactive with the solidifying agent of the curing composition. Suitable viscosity increasing agents include polyamines, e.g., having at least two primary amine groups, for instance, polymethylenediamines, polyalkyletherdiamines, dialkylenetriamine (such as diethylenetriamine), trialkylenetetramines (such as triethylenetetramine), methylenedianiline, isophorone diamine, N-aminoethylpiperazine, and the like; polyamides; tertiary amine salts; and the like. Often the desirable viscosity increasing agents are substantially noncatalytic, i.e., each of the reactive sites on the viscosity increasing agent can cause reaction of only one glycidyl group. Accordingly, the viscosity increasing agent is generally in an amount of less than about 40, say, about 1 to 40, e.g., about 10 to 25, mole percent of that required for complete reaction with the glycidyl groups in the liquid resinous composition.

The solidifying agent of the curing agent composition is provided in an amount at least sufficient to solidify the liquid resinous composition. The solidifying agent exhibits lower reactivity with glycidyl groups than does the viscosity increasing agent. For instance, at lower temperatures, e.g., below an initiation temperature, say, about 30° C. or 35° C. for many solidifying agents, the solidifying agent may exhibit little if any reactivity with glycidyl groups; however, when the temperature of the liquid resinous composition is increased, the reaction between the solidifying agent and the glycidyl groups may proceed, and may even proceed rapidly. The solidifying agent, therefore extends the duration of the curing reaction and thereby permits heat liberated during the curing reaction to be dissipated in order to avoid excessive temperatures. Since the viscosity increasing agent enables the filler to be adequately maintained in suspension in the liquid resinous composition, the extended curing duration can be advantageously utilized. Suitable solidifying agents often include the slower reacting curing agents such as secondary amines, sterically hindered primary amines, anhydride curing agents, and the like such as described above. Frequently, suitable solidifying agents exhibit pot lives in the liquid resinous composition of at least about 3, say, at least about 4, e.g., about 4 to 24 hours at 35° C. Particularly preferred solidifying agents for producing high strength, high chemical resistant tube sheets are those which directly or indirectly (e.g., by catalysis) consume three or more glycidyl groups per molecule. Exemplary of these preferred solidifying agents may include imidazole curing agents, such as described above. A highly desirable solidifying agent comprises 2-ethyl-4-methylimidazole. Another desirable solidifying agent comprises methylene dianiline or a mixture of dimethyl aniline and diphenyl amine.

The solidifying agent is provided in an amount sufficient that the curing agent composition can consume at least about 90, preferably, at least about 95 or 100, percent of the glycidyl groups in the liquid resinous composition. Preferably, in the cured resinous composition, less than about 10, say, less than about 5, percent of the functionally reactive groups provided by the curing agent composition are unreacted. When solidifying agents are employed which have catalytic activity to promote additional reactions which consume glycidyl groups, the amount of such agents may often influence the degree of cross-linking, i.e., the number of glycidyl groups consumed per molecule of curing agent, With solidifying agents such as the imidazole curing agents, the amount of imidazole curing agent provided generally influence the degree of cross-linking. Frequently, catalytic solidifying agents are provided in an amount of between about 2 to 40, say, about 2 to 30, and preferably about 5 to 20, percent of the amount required for complete reaction with the catalytic curing agent on a stoichiometric basis. Advantageously, the viscosity increasing agent may consume sufficient glycidyl groups that lower amounts of such catalytic solidifying agents can be employed, and hence a higher degree of cross-linking obtained, than if no viscosity increasing agent were employed. Often such catalytic solidifying agents are employed in an amount of about 0.01 to 0.5, say, about 0.02 to 0.25, moles of catalytic solidifying agent per mole of glycidyl group in the liquid resinous composition. Frequently, the mole ratio of viscosity increasing agent to the solidifying agent is about 0.5:1 to 2:1, say, about 0.1:1 to 1:1, e.g., about 0.1:1 to 0.7:1.

The liquid resinous composition may contain other components such as plasticizers, antiplasticizers, bond promoting agents, cure accelerators, thickening agents, dyes, and pigments. Plasticizers include phthalates (e.g., dibutylphthalate and dioctylphthalate), tricresyl phosphate, and the like. Bond promoting agents include the tertiary amines such as benzyl dimethyl amine, N-methyl morpholine, dimethylaminopropylamine, and the like. Accelerators include resorcinol, nonyl phenol, bisphenol A, triphenyl phosphate, toluene sulfonic acid, lactic acid, salicylic acid, and the like. Thickening agents include very finely divided solids (e.g., less than 1 micron in average maximum particle size and often having a surface area greater than about 3 or 5 square meters per gram) such as colloidal silica, clays and the like. Most frequently, accelerators and thickening agents are not required to provide suitable liquid resinous compositions for forming tube sheets in accordance with this invention.

In many instances, at least about 95, e.g., at least about 98 to essentially 100, weight percent of the liquid resinous composition may consist of the resin, curing agent composition and filler. The viscosity of the liquid resinous composition is frequently about 1,000 to 15,000, say, about 1,000 to 10,000, and most preferably about 1,000 to 6,000 or 7,000, centipoises at 25° C.

The liquid resinous composition may be formed into the tube sheet in any suitable manner. For instance, the liquid resin can be placed on the end portions of a plurality of hollow fiber membranes and the hollow fiber membranes then assembled into the form of a bundle such as disclosed in U.S. Pat. Nos. 3,455,460 (Mahon) and 3,690,465 (McGinnis, et al.), herein incorporated by reference. In this type of assembly, the end portions of the hollow fiber membranes join to form an integral resinous tube sheet.

More advantageously, the liquid resinous compositions are particularly useful for forming tube sheets by casting the liquid resinous composition around a previously assembled bundle containing a plurality of hollow fiber membranes. These casting methods for forming tube sheets are highly preferred due to its simplicity and freedom from complex fabrication equipment. In these casting methods, for instance, a bundle of hollow fiber membranes is placed in a mold with generally either the ends of the bores of the hollow fiber membranes sealed or the hollow fiber membranes looped such that the liquid resinous composition is not drawn into the bores. The liquid resinous composition can then be introduced into the mold and thus cast in substantially the configuration of the tube sheet. When the liquid resinous composition is cast to form the tube sheet, it is preferred that the viscosity of the liquid resinous composition be up to about 6,000, e.g., about 500 or 1,000 to 5,000, e.g., about 1,000 to 4,000, centipoises at the temperature of casting. The casting may be conducted at an elevated temperature to reduce the viscosity of the liquid resinous composition; however, excessively high casting temperatures can accelerate the curing reactions of the resin and may result in undesirable temperatures being generated due to exotherming. Therefore, the temperature of the liquid resinous composition during casting is often less than about 45° C., say, about 15° to 40° C.

Any suitable curing schedule for the resin may find application in preparing the tube sheets of this invention. In many instances, the curing of the liquid resinous composition proceeds in three steps: first, initiation of curing; second, solidification; and third, final cross-linking. In these instances, the conditions to which the resin is subjected during curing can affect the curing rate, the peak temperature achieved during curing by the resin, and the degree of cross-linking of the resin. Frequently, even though curing may initiate at ambient temperature, e.g., 10° to 30° C., heat may desirably be supplied to the liquid resinous composition at the initial stage of curing in order to assist in initiating the curing reactions. The temperature is preferably below that temperature at which the rate of reaction becomes so fast that most of the heat generated can not be dissipated and unduly higher temperatures are produced which even further accelerate the rate of reaction. This phenomenon is referred to herein as exotherming and the peak temperature during curing is referred to as the peak exotherm temperature. The rate at which the curing is initiated may affect the peak temperature which is achieved during the exotherm. Preferably, the temperature of the liquid resinous composition during the cure initiation stage is such that undesirable peak exotherm temperatures are not produced. The peak exotherm temperature of the curing reaction should be below the temperature at which the hollow fiber membranes are unduly adversely affected, e.g., in terms of strength, chemical resistance, and/or permeation properties. Frequently, the peak exotherm temperature of the curing reaction is at least 10° C. or 20° C. below the glass transition temperature of the hollow fiber membrane. When heat is supplied, usually the temperature of the liquid resinous composition is up to about 45° C. e.g., about 25° C. or 30° C. to 40° C.

The solidifying stage of the curing reaction is usually conducted at elevated temperatures due to the heat generated during the curing reactions. If necessary, heat may be supplied to the curing resin to provide a desirable rate of reaction; however, once initiated, the curing reactions usually proceed to solidification of the resin without the need to supply heat. Advantageously, the peak temperature during solidification is at least 10° C. or 20° C. below the glass transition temperature of the hollow fiber membrane. Sometimes, the peak exotherm temperature during solidification is less than about 150° C., e.g., less than about 130° C., say, about 25° to 120° C.

As the curing reaction approaches completion, the curing reaction slows down since the concentration of reactants is substantially reduced. In the final cross-linking stage, which is optional, the temperature of the resin is increased to, e.g., promote reactant mobility and achieve additional cross-linking (curing). This additional cross-linking may provide a substantial increase in the strength and chemical resistance properties of the tube sheet even though the amount of cross-linking is small. Generally, the temperatures employed for final cross-linking are below about 10° C. or 20° C. below the glass transition temperatures of the hollow fiber membranes. With highly temperature stable hollow fiber membranes the curing mass may be up to about 150° C.

or 170° C.; however, most frequently, the temperature is about 40° C. to 120° C. or 130° C. The duration of the heating during the final cross-linking stage of the curing reactions is generally dependent upon the desired degree of cross-linking. With excessive crosslinking, the tube sheet may be undesirably brittle. Frequently, the duration of this heating is sufficient to provide a substantially uniform temperature throughout the tube sheet. Often the duration is at least about 1, say, at least about 2, hours. Duration in excess of about 24 or 36 hours may be less desired due to the time required in the fabrication of the tube sheet. Preferably, the duration of this heating is about 1 to 24, say, about 1 to 16, hours.

In the aspect of this invention in which the curing agent composition contains a viscosity increasing agent and a solidifying agent, the curing schedule is generally extended, and two initiation stages may be required, the first being to initiate the reaction of the viscosity increasing agent, and the second being at a higher temperature, often at least about 5° C. higher, e.g., about 5° C. to 20° C. higher, to initiate the reaction of the solidifying agent.

In a preferred method, the curing of the liquid resinous composition is conducted such that the temperature of the tube sheet during curing is sufficiently uniform throughout its volume that undue stresses are not produced. Often difference in peak exotherm temperatures within the volume of the tube sheet during curing is less than about 40° C., most frequently, less than about 30° C., and sometimes this peak exotherm temperature difference is less than about 20° C. The time of the peak exotherm temperatures may, of course, vary throughout the volume of the tube sheet. Since the curing reactions are exothermic, in many instances the mold is insulated, or even heated, in order to undue cooling of the outer regions of the tube sheet and thus maintain the outer regions of the tube sheet at approximately the same temperature as the inner regions of the tube sheet. Accordingly, the curing of the liquid resinous composition can be substantially adiabatic with the filler absorbing a substantial amount of the heat generated by the exothermic curing reactions, and the rate of heat loss to the surrounding environment is at a sufficiently low rate that unduly large temperature differentials during curing, which differentials may promote stresses in the tube sheet, do not occur.

After forming the tube sheet, e.g., by assembling a bundle of hollow fiber membranes having liquid resinous compositions at the end portion or by casting, the tube sheet is generally severed to expose the bores of the hollow fiber membranes.

Permeators containing hollow fiber membranes in which tube sheets are usually employed are generally characterized by having an elongated tubular shell having at least one open end adapted to receive a tube sheet; an essentially fluid impermeable end closure cap fastened to and covering the elongated tubular shell at the open end, the end closure cap having at least one fluid communication port; a plurality of hollow fiber membranes which are generally parallel and extend longitudinally to form at least one bundle is the elongated tubular shell; a tube sheet having at least one end of each of the hollow fiber membranes embedded therein in a fluid-tight relationship and such that the bores of the hollow fiber membranes are in fluid communication through the tube sheet; and at least one fluid ingress port and at least one fluid egress port communicating through the elongated tubular shell. The elongated tubular shell may be in any suitable cross-sectional configuration to retain the bundle of hollow fiber membranes. Conveniently, the tubular shell has a circular cross-section, and the bundle of hollow fiber membranes substantially fills the cross-section of the tubular shell. However, other cross-sectional configurations may be suitable such as rectangular, oval, free form, or the like.

The permeator may be a single ended or double ended permeator. A single ended permeator has a tube sheet at only one end, and one or both ends of the hollow fiber membranes are embedded in the tube sheet. When only one end of each of the hollow fiber membranes is embedded in the tube sheet, the other end must be plugged or otherwise closed. In a double ended permeator, a tube sheet is provided at each end of the tubular shell, and the hollow fiber membranes may extend from one tube sheet to the other tube sheet, or the permeators may contain at least two distinct bundles of hollow fiber membranes where at least one bundle extends into only one tube sheet. In many instances, a single bundle of hollow fiber membranes is employed in a permeator and at least one end of the hollow fiber membranes in the bundle is embedded in a tube sheet. The opposite end of the hollow fiber membranes may be looped back, i.e., the bundle is generally in a "U" shape, and embedded in the same tube sheet, or the opposite end of the hollow fiber membranes may be plugged or embedded in another tube sheet. When the hollow fiber membranes in the bundle are in a "U" shape, the ends may be segmented such that different regions on the tube sheet contain each end of the hollow fiber membranes. Each of these regions on a tube sheet can be maintained in an essentially fluid impermeable relationship such that the fluid communication between the regions can only occur by passage of fluid through the bores of the hollow fiber membranes.

The permeator may be operated in any desired manner, e.g., the fluid feed mixture may be introduced into the shell and initially contact the shell side of the hollow fiber membrane, or it may be introduced into the bores of the hollow fiber membranes. The flow pattern of the fluid on the shell side of the hollow fiber membranes may be primarily transverse to the longitudinal orientation of the hollow fiber membranes or may be primarily axial to the orientation of the hollow fiber membranes. When the flow on the shell side of the hollow fiber membranes is axial, it may be generally concurrent or countercurrent with the flow in the bores of the hollow fiber membranes.

The tube sheets are in a fluid tight relationship with respect to the tubular shell. This fluid tight relationship is usually achieved by a sealing means positioned between the tube sheet and at least one of the end closure cap and the tubular shell. For instance, the sealing means can be "O"-rings or gaskets positioned between the side of the tube sheet and the interior surface of the tubular shell such as disclosed by McLain in U.S. Pat. No. 3,422,008; Caracciolo in U.S. Pat. No. 3,528,553; McNamara, et al., in U.S. Pat. No. 3,702,658; and Clarke in U.S. Pat. No. 4,061,574, all herein incorporated by reference. Alternatively, the fluid tight relationships can be provided by positioning an "O"-ring or other gasket between the end face of the tube sheet or lateral projection from the tube sheet and the end closure cap such as disclosed in copending United States patent applications Ser. Nos. 151,003 (Coleson, et al.), filed May 19, 1980, (a continuation of U.S. patent application Ser. Nos. 972,642, filed Dec. 22, 1978, now abandoned) and 086,211 (Bollinger, et al.) filed Oct. 18, 1979, now U.S. Pat. No. 4,265,763 both herein incorporated by reference. In order to ensure that each of the hollow fiber membranes is embedded in the tube sheet and to provide regions in tube sheet of sufficient thickness to, e.g., provide "O"-rings or other gaskets for sealing, the peripheral dimensions of the tube sheet usually extend outside of the zone of the tube sheet through which the bundle of hollow fiber membranes passes. Thus, the tube sheet will contain a region having a high population of hollow fiber membranes and a region having a relative absence of hollow fiber membranes. These regions may exhibit, e.g., different curing properties including different peak exotherm temperatures during the solidification stage of curing due to the differences in resin density between the regions. The liquid resinous compositions used to prepare the tube sheets of this invention can enable the region having a relative absence of hollow fiber membranes to be of sufficient size to ensure desired embedding of the hollow fiber membranes and to provide adequate regions to permit the tube sheet to be in a fluid tight relationship. Most desirably, the average peripheral dimension around the tube sheet is at least about 2, say, about 5 to 50, e.g., about 5 to 25, percent larger than the average peripheral dimension of the zone of the tube sheet through which the bundle of hollow fiber membranes passes. In many instances, the difference between these perimeters is about 1 to about 15 ot 20 centimeters. The region of the tube sheet containing the hollow fiber membranes may contain a relatively high density of hollow fiber membranes. Usually the density of hollow fiber membranes is described in terms of packing factor which is the percentage of a given cross-sectional area which is occupied by hollow fiber membranes based on the cross-sectional dimensions of the hollow fiber membranes. Advantageously, this invention may enable desirable tube sheets to be prepared which have bundles of high packing factors based on the peripheral dimensions of the bundle in the tube sheet, e.g., packing factors of often at least about 40 or 45 percent, say, up to about 65 or 70 percent, most frequently about 50 to 60 percent.

Frequently, the tube sheet has an average cross-sectional dimension, e.g., diameter with tube sheets having circular cross-sectional configurations, of at least about 1 or 2 centimeters. While this average cross-sectional dimension may be up to 1 meter or more, many tube sheets have average cross-sectional dimensions of at least about 0.02, preferably, at least about 0.05 to 1.0, meter.

The length of the tube sheet (as determined in a direction parallel to the general orientation of the bundle of the hollow fiber membranes through the tube sheet) is generally sufficient to provide suitable strength for withstanding total pressure differentials to which the tube sheet may be subjected in intended separation operations. Thus, the length employed may depend upon the strength of the cured resin. Also, the tube sheet should have sufficient length that ample contact is provided between the tubes and the cured resin such that an essentially fluid tight relationship is ensured. Consequently, the adherence between the tubes and the material of the tube sheet will also affect the desired length of the tube sheets. Often, tube sheets are at least about 2, e.g., about 2 to 100, say, about 2 to 25 or 50, centimeters in length.

The volume of liquid resinous composition employed to make the tube sheets of this invention will vary depending upon the size of the tube sheet and the portion of the volume of the tube sheet occupied by hollow fiber membranes. Frequently, more than about 500 or 1,000 or 1,500 grams of liquid resinous composition are required to fabricate the tube sheet, and the liquid resinous compositions of this invention may enable these large tube sheets to be fabricated in a single casting without undue rusk of damage to the hollow fiber membranes due to heat generated during curing the resin.

Hollow fiber membranes may be fabricated from any suitable synthetic or natural material suitable for fluid separation or for the support of materials which effect the fluid separations. The selection of the material for the hollow fiber may be based on heat resistance, chemical resistance, and/or chemical strength of the hollow fiber as well as other factors dictated by the intended fluid separation for which it will be used and the operating conditions to which it will be subjected. The material for forming the hollow fibers may be inorganic, organic or mixed inorganic and organic. Typical inorganic materials include glasses, ceramics, cermets, metals and the like. The organic materials are usually polymers.

Typical polymers which may be suitable for hollow fiber membranes include substituted and unsubstituted polymers selected from polysulfones; poly(styrenes), including styrene-containing copolymers such as acrylonitrile-styrene copolymers, styrene-butadiene copolymers and styrene-vinylbenzylhalide copolymers; polycarbonates; cellulosic polymers, such as cellulose acetate-butyrate, cellulose propionate, ethyl cellulose, methyl cellulose, nitrocellulose, etc.; polyamides and polyimides, including aryl polyamides, polyimides, and copolymers of polyamides; polyethers; polyacetal; poly(acrylene oxides) such as poly(phenylene oxide) and poly(xylylene oxide); poly(esteramide-diisocyanate); polyurethanes; polyesters (including polyarylates), such as poly(ethylene terephthalate), poly(alkyl methacrylates), poly(alkyl acrylates), poly(phenylene terephthalate), etc.; polysulfides; polymers from monomers having alpha-olefinic unsaturation other than mentioned above such as poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidine fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes), such as poly(vinyl formal) and poly(vinyl butyral), poly(vinyl amines), poly(vinyl phosphates), and poly(vinyl sulfonates); polyallyls; poly(benzobenzimidazole); polyhydrazides; polyoxadiazoles; polytriazoles; poly(benzimidazole); polycarbodiimides; polyphosphazines, etc., and interpolymers, including block interpolymers containing repeating units from the above such as terpolymers of acrylonitrile-vinyl bromide-sodium salt of para-sulfophenylmethallyl ethers; and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acyl groups and the like.

The cross-sectional dimensions of the hollow fiber membranes may be selected over a wide range; however, the hollow fiber membranes should have sufficient wall thickness to provide adequate strength, and the bore (lumen) should be sufficiently large as to not result in an unduly high pressure drop to fluids passing in the bore or plugging due to the presence of solids in the fluids passing through the bores. Frequently, the outside diameter of the hollow fiber membranes is at least about 20, say, at least 30, microns, and the same or difference outside diameter fibers may be contained in a bundle. Often the outside diameter of hollow fiber membranes does not exceed about 800 or 1,000 microns since such larger diameter hollow fibers may provide less desirable ratios of hollow fiber surface area per unit volume of the permeator. Preferably, the outside diameter of hollow fiber membranes is about 50 to 800 microns, and most desirably, about 150 or 300 to 600 or 800 microns. Generally, the wall thickness of the hollow fiber membranes is at least about 5 microns, and in some hollow fiber membranes, the wall thickness may be up to about 200 or 300 microns, say, about 50 to 200 microns. With hollow fiber membranes fabricated from materials having lesser strength, it may be necessary to employ larger hollow fiber diameters and wall thicknesses to impart sufficient strength to the hollow fiber membrane. The walls of the hollow fiber membranes may be essentially solid or may contain a substantial void volume. When volids are desired, the density of the hollow fiber membrane can be essentially the same throughout its wall thickness, i.e., the hollow fiber membrane is isotropic, or the hollow fiber membrane can be characterized by having at least one relatively dense region within its wall thickness in barrier flow relationship in the wall of the hollow fiber membrane, i.e., the hollow fiber membrane is anisotropic.

The hollow fiber membranes are generally parallelly arranged in the form of one or more bundles in the shell. Generally, at least about 10,000 and often substantially greater numbers, e.g., up to 1 million or more hollow fibers are contained in a permeator. The fibers in the bundle, for instance, may be relatively straight, or they may be spirally wound such as disclosed by McLain in U.S. Pat. No. 3,422,008.

The following examples are provided to further illustrate the invention but not in limitation of the invention. In the examples, all parts and percentages of liquids and solids are by weight and of gases are by volume, unless otherwise indicated.

EXAMPLE 1

A bundle of about 66,000 hollow fiber membranes, which membranes have an exterior skin, an outside diameter of about 560 microns, and are fabricated from polysulfone (P-3500 available from Union Carbide Corporation), is placed into an aluminum mold which has been sprayed with a silicone mold release. The hollow fiber membranes at the end of the bundle placed in the mold are sealed by melting. The mold has a slightly tapered cylindrical upper chamber having approximately a 24.5 centimeter maximum diameter at the top and a 10 centimeter depth and a concentric lower chamber having a 20.3 centimeter diameter and a 7.6 centimeter depth. The mold has a concentric plug hole having a diameter of about 10 centimeters at the bottom. The mold is electrically heated. The bundle is vertically oriented, and the bottom end of the bundle fits into the lower chamber of the mold (about a 55 percent packing factor based on the diameter of the lower chamber) and bows out at the top of the mold. The mold is heated to about 35° C.

A mixture of approximately 5400 grams o EPON TM 826, (an unmodified bisphenol A epoxy resin having a viscosity of about 65–95 poises at 25° C. and an epoxy equivalent weight of about 180 to 190, available from Shell Company) 600 grams of neopentyl glycol diglycidyl ether, and 3900 grams of finely divided (minus 325 mesh U.S.S.) aluminum powder available as Reynolds #120 aluminum powder (average particle size of about 20 to 30 microns) from Reynolds Metal Company is prepared and is heated to about 35° C. Approximately 240 grams of Versamid TM 140 (a polyamide reactive resin having a viscosity of about 2 to 6 poises at 75° C. and an amine value of about 370 to 400 and available from General Mills, Inc.) and 210 grams of 2-ethyl-4-methylimidazole (EMI-24 TM available from Fike Chemical Company) are separately heated to about 35° C. and then admixed with the mixture containing the polyglycidyl resins to provide the liquid resinous composition. The mixing takes about 5 to 10 minutes, and the liquid resinous composition is poured into the mold. Approximately three or four pours of liquid resinous composition are required to fill the mold cavity since the liquid resin penetrates within the bundle. Approximately 150 grams of the remaining liquid resinous composition are placed into a refrigerator. A thick cord is tied around the bundle above the level of the liquid resin in the mold such that the diameter of the bundle is about 20 to 22 centimeters. The cord is then slipped down the bundle to slightly below the level of the liquid resinous composition.

The mold is maintained at 35° C. for 18 to 20 hours at which time the resin has solidified and has slightly shrunk. The refrigerated liquid resinous composition is placed on top of the solidified resin to top-off the tube sheet. The mold temperature is then increased to 45° C. for two hours, then to 55° C. for two hours, then to 65° C. for two hours, then to 75° C. for two hours and finally to 100° C. for two hours. The mold is allowed to cool to room temperature, and the tube sheet is removed from the mold. The bundle side of the tube sheet evidences a moderate, e.g., less than about 5 centimeters, wicking which is relatively uniform across the bundle.

The portion of the tube sheet formed by the lower chamber is cross-sectionally severed with a hand saw about 3 to 7 centimeters from the portion formed by the larger chamber of the mold to expose the hollow fiber membranes, i.e., form the face of the tube sheet. The face of the tube sheet is then planed with an electric planar and trimmed with a razor-sharp draw knife to ensure that the bores of the hollow fiber membranes are open to fluid flow.

This procedure is repeated with about 98,000 hollow fiber membranes having an exterior skin and an outside diameter of about 450 microns and being composed of polysulfone (P-3500), except that the depth of the upper chamber of the mold is about 15 centimeters, the temperature of the liquid resinous composition when cast is about 30° C., and the mold is maintained at about 30° C. for 18 hours (during which a peak exotherm temperature of about 130° C. is observed) and is then heated to 60° C. for about four hours and cooled. Usually with larger tube sheets having larger volumes of liquid resinous composition per unit surface area of tube sheet, the peak exotherm temperatures may be higher. Thus, the observed peak exotherm temperatures produced using the deeper mold are greater than those produced using the shallower mold of the same cross-sectional dimensions. However, the peak exotherm temperatures are reduced by lowering the initial temperature of the mold and liquid resinous composition from about 35° C. to about 30° C. If the initial temperature of the mold and liquid resinous composition is about 25° C., desirable penetration of the liquid resinous composition into the bundle may not be achieved.

EXAMPLE 2

The procedure of Example 1 is substantially repeated except that an epoxy-silane (gamma-glycidoxypropyl-trimethoxysilane (0.5 percent)) coupled silica having a surface area of about 2 square meters per gram and an average maximum particle size of about 5 microns (NOVAKUP TM 187 available from Malvern Minerals Company) is used instead of the aluminum powder.

EXAMPLE 3

A bundle of about 25,000 hollow fiber membranes, which membranes have an exterior skin, an outside diameter of about 450 microns, and are fabricated from polysulfone (P-3500), is placed into an aluminum mold which has been sprayed with a silicone mold release. The mold has a slightly tapered upper chamber having a maximum diameter at the top of approximately 14.5 centimeters and a 12.7 centimeter depth, and a concentric lower chamber having a diameter of 10.3 centimeters and a depth of 7.6 centimeters. The mold has a concentric plug hole at the bottom having a diameter of about 10.2 centimeters. The mold is electrically heated. The bundle is vertically oriented, and the bottom end of the bundle fits into the lower chamber of the mold and bows out at the top of the mold. The mold is heated to about 35° C.

A liquid resinous composition is prepared substantially as set forth in Example 1 except using the following components in the designated amounts:

EPON TM 826: 1800 grams
Aluminum Powder #123: 1300 grams
Neopentyl glycol diglycidyl ether: 200 grams
Versamid TM 140: 80 grams
EMI-24 TM : 70 grams Aluminum powder #123 is an atomized aluminum having an average particle size of about 30 microns and a surface area of about 0.2 to 0.3 square meters per gram.

Substantially the same curing schedule disclosed in Example 1 is utilized to cure the liquid resinous composition to provide a tube sheet.

EXAMPLES 4 TO 6

The procedure of Example 1 is substantially repeated except using the following components in the designated amounts

| Component | Approximate Amount, Grams | | |
| --- | --- | --- | --- |
| | Example 4 | Example 5 | Example 6 |
| EPON$^{TM}$ 826 | 4100 | 4100 | 4100 |
| Aluminum Powder #123 | 3540 | 3540 | 3540 |
| Neopentyl glycol diglycidyl ether | 460 | 460 | 460 |
| EMI-24$^{TM}$ | 183 | 160 | 137 |
| Versamid$^{TM}$ 140 | 0 | 229 | 183 |

The cure schedule (mold temperatures and times, room temperature is about 20° to 25° C.), time to peak exotherm temperature, and range of peak exotherm temperatures are as follows

| Example | Cure Schedule | | | Temp. Range in Tube Sheet at Peak Exotherm, °C. |
| --- | --- | --- | --- | --- |
| | Time at Room Temp., Hours | Elevated Mold Temp., °C. | Time From Temp. Deviation to Peak Exotherm Temp., Hours | |
| 4 | 19 | 45 | 5 | 122–148 |
| 5 | 0 | 35 | 12 | 52–79 |
| 6 | 22 | 45 | 7–8 | 106–142 |

EXAMPLE 7 AND 8

Example 3 is substantially repeated except using the following components in the designated amounts in parts by weight

| | Example 7 | Example 8 |
| --- | --- | --- |
| Araldite TM 509 | 100 | — |
| EPON TM 8132 | — | 100 |
| Polyamide 840 | 40 | — |
| Versamid TM 140 | — | 40 |
| Novakup TM 187 | 50 | 65 |

Araldite TM 509 is a mixture of decyl glycidyl ether and a diglycidyl ether of bisphenol A and has a viscosity of about 500 to 700 centipoises at 25° C. and an epoxy equivalent weight of about 189 to 200 and is available from Ciba-Geigy Company. EPON TM 8132 is a mixture available from Shell Chemical Company of 80 percent by weight of a diglycidyl ether of bisphenol A having a viscosity of about 170–225 poises at 25° C. and an epoxy equivalent weight of about 190 to 198 and 20 percent by weight of a monofunctional reactive diluent, and has a viscosity of 5 to 7 poises at 25° C. and an epoxy equivalent weight of about 195 to 215. Polyamide 840 is a polyamide reactive resin having an amine value of about 370 to 400 and is available from Ciba-Geigy Company.

The resinous compositions are cured at room temperatures and then post cured for two hours at 75° C. and provide good tube sheets.

A particularly useful method for evaluating the potential suitability of a liquid resinous composition for use in forming a tube sheet is by casting a mass of the resin which approximates the amount required to form the tube sheet and observe the curing characteristics of the mass of resin.

EXAMPLES 9 TO 15

Approximately four liter samples of liquid resinous compositions are prepared and cast into heated metal containers, and the liquid resinous compositions are cured. In Example 15 only about 1 liter of liquid resinous composition is prepared. Table I provides the relevant details. In the table, the following abbreviations are used:

826: EPON TM 826
8132: EPON TM 8132
509: Araldite TM 509
IDA: Isophorone diamine
EMI: 2-ethyl-4-methylimidazole
Agent Z: Methylene dianiline available from Shell Chemical Company
NAP: N-aminoethylpiperazine
Agent D: A polyamine salt curing agent available from Shell Chemical Company
BDMA: Benzyl dimethylamine HHPA: Hexahydrophthalic anhydride
Al: Aluminum powder available as Aluminum Powder #123 from Alcoa.
R.T.: Room temperature, about 20° to 25° C.

TABLE I

| Example | Resin (Parts by Weight) | Curing Composition (Parts by Weight) | Filler (Parts by Weight) | Cure Temp., °C. | Peak Exotherm Temp., °C. | Filler Sedimentation |
| --- | --- | --- | --- | --- | --- | --- |
| 9 | 826 (100) | IDA (3) EMI (3.5) | Al (65) | 35 | 155 | No |
| 10 | 826 (100) | Versamid™ 140 (4) Agent Z (19) | Al (65) | 35 | 163 | No |
| 11 | 826 (100) | NAP (2) EMI (3.5) | Al (65) | 35 | 161 | No |
| 12 | 826 (100) | Agent D (1.5) EMI (3.5) | Al (65) | 35 | 178 | No |
| 13 | 8132 (100) | Versamid™ 140 (40) | Al (65) | R.T. | 60 to 82 | None to Slight |
| 14 | 509 (100) | Versamid™ 140 (40) | Novakup™ 187 (65) | R.T. | 95 | No |
| 15 | 826 (100) | Versamid™ 140 (5) BDMA (3) HHPA (80) | Al (65) | 35° for 18 hrs. 80° for 2 hrs. | 134 | No |

EXAMPLES 16 TO 18

The procedure of Example 3 is substantially repeated except that the bundle contains about 17,000 polysulfone (P-3500) hollow fiber membranes having an exterior skin and an outside diameter of about 560 microns, the mold and liquid resin temperatures are initially 30° C., and the mold is at 30° C. for about 18 hours, then at 45° C. for 2 hours, then at 55° C. for 2 hours, then at 65° C. for 2 hours, then at 75° C. for 2 hours and finally at 100° C. for 2 hours, and as set forth in Table II. In Table II, the following abbreviations are used:

pw: Parts by weight
826: EPON TM 826
8132: EPON TM 8132
NC: Novacite TM 207A available from Malvern Minerals Company which is a silica having an average particle size of about 3.6 microns and a surface area of about 2 square meters per gram.
Fe: Electrolytic iron powder having an average particle size of 6 microns available as A-130 electrolytic iron powder from Glidden Metals, SMC Corporation.
Cu: Copper powder available as 500 RL from Glidden Metals, SMC Corporation.
RD-4: Vinylcyclohexene dioxide available from Ciba-Geigy.
H-68: Heloxy TM 68
TETA: Triethyl tetramine
V-140: Versamid TM 140
A-U: Curing agent U, a modified fast-curing, liquid amine having a viscosity of about 100 poise at 25° C., available from Shell Chemical Company.
EMI: 2-Ethyl-4-methylimidazole

TABLE II

| Example | Resin (pw) | Curing Composition (pw) | Filler (pw) |
| --- | --- | --- | --- |
| 16 | 8132 (100) | V-140 (35) | NC (45) |
| 17 | 826 (100) RD-4 (20) | TETA (5) EMI (3.5) | Cu (150) |
| 18 | 826 (100) H-68 (20) | A-U (8) EMI (3) | Fe (150) |

It is claimed:
1. A tube sheet having a plurality of hollow fiber membranes suitable for fluid separations embedded therein, said tube sheet being adapted to be positioned in a fluid tight relationship within a permeator and said tube sheet comprising a cured, solidified resinous composition of a liquid resinous composition, said liquid reinous composition comprising
   a. resin containing a major amount by weight of polyglycidyl resin having a viscosity of about 1000 to 30,000 centipoises at 25° C., said resin having a viscosity of about 500 to 12,000 centipoises at 25° C.;
   b. curing agent composition in an amount sufficient to comsume at least about 90 percent of the glycidyl groups in the liquid resinous composition; and
   c. particulate filler having a density of about 1 to 10 grams per cubic centimeter at 25° C., an average maximum particle size of about 1.5 to 150 microns, and a surface area of less than about 5 square meters per gram of filler, said filler comprising about 5 to less than about 35 percent by volume of the liquid resinous composition wherein the liquid resinous composition has a viscosity of about 1000 to 10,000 centipoises at 25° C.

2. The tube sheet of claim 1 wherein the filler comprises about 10 to 25 percent by volume of the liquid resinous composition.

3. The tube sheet of claim 1 wherein the filler has a surface area of about 0.1 to 2.5 square meters per gram, and the average maximum particle size is about 2 to 100 microns.

4. The tube sheet of claim 1 wherein the filler has an aspect ratio of about 1:1 to 20:1.

5. The tube sheet of claim 3 wherein the filler is inorganic or organic-modified inorganic.

6. The tube sheet of claim 5 wherein the filler comprises a metal.

7. The tube sheet of claim 6 wherein the filler comprises aluminum powder.

8. The tube sheet of claim 5 wherein the filler comprises silica.

9. The tube sheet of claim 1 wherein the polyglycidyl resin comprises a glycidyl reaction product of glycidyl-forming compound and a compound selected from among bisphenol A, resorcinol, catechol, hydroquinone, phloroglucinol, 4,4'-dihydroxybenzophenone, 1,1-bis-(4-hydroxyphenyl)ethane, bis(2-hydroxynaphthyl)methane, 2,2-bis(4-hydroxyphenyl)butane, 4,4'-dihydroxydiphenyl sulfone, ethylene glycol, propylene glycol, butanediol, pentanediol, isopentanediol, linoleic dimer acid, poly(oxypropylene)glycol, 2,4,4'-trihydroxybisphenyl, 2,2',4,4'-tetrahydroxybisphenyl, bisresorcinol F, 2,2',4,4'-tetrahydroxybenzophenone, bisphenol-hexafluoroacetone, aniline, para-aminophenol, isocyanuric acid, hydantoin, 1,1',2,2'-tetra(p-hydroxyphenyl)ethane, phenol-formaldehyde novolac, o-cresol-formaldehyde novolac, or a mixture thereof.

10. The tube sheet of claim 9 wherein the polyglycidyl resin comprises a glycidyl reaction product of a glycidyl-forming compound and bisphenol A or phenolformaldehyde novolac.

11. The tube sheet of claim 10 wherein the polyglycidyl resin comprises a mixture of diglycidyl ethers of bisphenol A.

12. The tube sheet of claim 9 wherein the polyglycidyl resin comprises a major amount by weight of diglycidyl ether having a weight average molecular weight of at least about 300 and a minor amount by weight of diglycidyl ether having a weight molecular weight average of less than about 250 such that the polyglycidyl resin has a viscosity of about 4000 to 25,000 centipoises at 25° C.

13. The tube sheet of claim 12 wherein the higher molecular weight diglycidyl ether has a weight average molecular weight of about 300 to 600 and a viscosity of about 4000 to 30,000 centipoises at 25° C.

14. The tube sheet of claim 12 wherein the lower molecular weight diglycidyl ether has a weight average molecular weight of about 200 to 250 and a viscosity less than about 5000 centipoises at 25° C.

15. The tube sheet of claim 12 where the lower molecular weight diglycidyl ether comprises an alkyl diglycidyl ether where the alkyl group has from 4 to 7 carbon atoms.

16. The tube sheet of claims 13, 14 or 15 wherein the higher molecular weight diglycidyl ether comprises diglycidyl ether of bisphenol A.

17. The tube sheet of claim 12 wherein the lower molecular weight diglycidyl ether is less than about 30 weight percent of the polyglycidyl resin.

18. The tube sheet of claim 12, 13 or 14 wherein the lower molecular weight diglycidyl ether is about 0.5 to 20 weight percent of the polyglycidyl resin.

19. The tube sheet of claim 1, 9 or 12 in which diglycidyl compounds comprises about 90 to essentially 100 weight percent of the polyglycidyl resin.

20. The tube sheet of claim 1 in which the curing agent comprises a viscosity increasing agent, which reacts with glycidyl groups in the liquid resinous composition, in an amount sufficient to increase the viscosity of the liquid resinous composition to reduce the tendency of the filler to settle, and a solidifying agent, which reacts more slowly with glycidyl groups in the liquid resinous composition than does the viscosity increasing agent, in an amount sufficient to solidify the liquid resinous composition.

21. The tube sheet of claim 20 in which the viscosity increasing agent is in an amount sufficient to increase the viscosity of the liquid resinous composition to at least 50,000 centipoises at 50° C.

22. The tube sheet of claim 20 in which the viscosity increasing agent is in an amount less than about 40 mole percent of that required for complete reaction with glycidyl groups in the liquid resinous composition.

23. The tube sheet of claim 22 in which the viscosity increasing agent is in an amount of about 10 to 25 mole percent of that required for reaction with glycidyl groups in the liquid resinous composition.

24. The tube sheet of claim 23 in which the viscosity increasing agent comprises a polyamine, polyamide, or tertiary amine salt.

25. The tube sheet of claim 20 in which the solidifying agent comprises imidazole curing agent having the structure

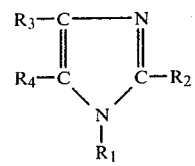

wherein $R_1$ is hydrogen, alkyl of 1 to about 12 carbon atoms, lower acyl or mono or bicyclic aryl or aralkyl of 6 to about 15 carbon atoms and $R_2$, $R_3$ and $R_4$ are hydrogen, halogen, hydroxy, nitro, alkoxy of 1 to about 6 carbon atoms, alkyl of 1 to about 12 carbon atoms, lower acyl, or mono or bicyclic aryl or aralkyl of 6 to about 15 carbon atoms.

26. The tube sheet of claim 25 in which the imidazole curing agent comprises 2-ethyl-4-methylimidazole.

27. The tube sheet of claim 20 in which the solidifying agent comprises at least one of methylene dianiline and diphenyl amine.

28. The tube sheet of claim 20, 24, 25, or 27 in which the mole ratio of the viscosity increasing agent to solidifying agent is about 0.5:1 to 2:1.

29. The tube sheet of claim 20 or 25 in which the solidifying agent is catalytic and is employed in an amount of about 0.01 to 0.5 mole per mole of glycidyl group in the liquid resinous composition.

30. The tube sheet of claim 1, 12 or 20 in which the viscosity of the liquid resinous composition is about 1,000 to 7,000 centipoises at 25° C.

31. The tube sheet of claim 1, 12 or 20 in which the tube sheet comprises at least about 1,000 grams of solidified resinous composition.

32. The tube sheet of claim 1 wherein the hollow fiber membranes are arranged in a bundle and the packing factor of the bundle in the tube sheet based on the peripheral dimensions of the bundle is at least about 45 percent.

33. The tube sheet of claim 1 wherein the tube sheet has a region having a relative absence of hollow fiber membranes and a region having hollow fiber membranes.

34. The tube sheet of claim 1, 12 or 20 wherein the average peripheral dimension around the tube sheet is about 5 to 50 percent larger than the average peripheral dimension of the zone of the tube sheet through which the bundle of the hollow fiber membranes passes.

35. The tube sheet of claim 1 having an average cross-sectional dimension of about 0.05 to 1.0 meter and a length of about 2 to 50 centimeters.

36. The tube sheet of claim 1 wherein the hollow fiber membranes have a diameter of about 150 to 800 microns.

37. In a method for forming a tube sheet having a plurality of hollow fiber membranes suitable for fluid separations embedded therein comprising introducing into a mold the plurality of hollow fiber membranes and a liquid resinous composition and then curing the liquid resinous composition, the improvement wherein the liquid resinous composition comprises
   a. resin containing a major amount by weight of polyglycidyl resin having a viscosity of about 1,000 to 30,000 centipoises at 25° C., said resin having a viscosity of about 500 to 12,000 centipoises at 25° C.;

b. curing agent composition in an amount sufficient to consume at least about 90 percent of the glycidyl groups in the liquid resinous composition; and
c. particulate filler having a density of about 1 to 10 grams per cubic centimeter at 25° C., an average maximum particle size of about 1.5 to 150 microns, and a surface area of less than about 5 square meters per gram of filler, said filler comprising about 5 to less than about 35 percent by volume of the liquid resinous composition wherein the liquid resinous composition of the temperature of casting has a viscosity of about 500 to 5,000 centipoises.

38. The method of claim 37 wherein the temperature of the liquid resinous composition during casting is about 15° C. to 40° C.

39. The method of claim 37 wherein the tube sheet is formed in a single casting.

40. The method of claim 39 wherein the liquid resinous composition is at least about 1,000 grams.

41. The method of claim 39 wherein the difference in peak exotherm temperatures in the tube sheet during curing is less than about 40° C.

42. The method of claim 39 wherein the mold is insulated or heated to maintain the outer regions of the tube sheet at approximately the same temperature as the inner regions of the tube sheet.

43. The method of claim 37 wherein the curing of the liquid resinous composition is substantially adiabatic.

44. The method of claim 39, 41 or 42 wherein the tube sheet has a region having a relative absence of hollow fiber membranes and a region having hollow fiber membranes.

45. The method of claim 37 wherein the filler comprises about 10 to 25 percent by volume of the liquid resinous composition.

46. The method of claim 37 wherein the filler has a surface area of about 0.1 to 2.5 square meters per gram, and the average maximum particle size is about 2 to 100 microns.

47. The method of claim 46 wherein the filler comprises a metal.

48. The method of claim 46 wherein the filler comprises silica.

49. The method of claim 37 wherein the polyglycidyl resin comprises a glycidyl reaction product of a glycidyl forming compound and a compound selected from among bisphenol A, resorcinol, catechol, hydroquinone, phloroglucinol, 4,4'-dihydroxybenzophenone, 1,1-bis(4-hydroxyphenyl)ethane, bis(2-hydroxynaphthyl)methane, 2,2-bis(4-hydroxyphenyl)butane, 4,4'-dihydroxydiphenyl sulfone, ethylene glycol, propylene glycol, butanediol, pentanediol, isopentanediol, linoleic dimer acid, poly(oxypropylene)glycol, 2,4,4'-trihydroxybisphenyl, 2,2',4,4'-tetrahydroxybisphenyl, bisresorcinol F, 2,2',4,4'-tetrahydroxybenzophenone, bisphenol-hexafluoroacetone, aniline, para-aminophenol, isocyanuric acid, hydantoin, 1,1',2,2'-tetra(p-hydroxyphenyl)ethane, phenolformaldehyde novolac, o-cresolformaldehyde novolac, or a mixture thereof.

50. The method of claim 49 wherein the polyglycidyl resin comprises a glycidyl reaction product of a glycidyl-forming compound and bisphenol-A or phenol-formaldehyde novolac.

51. The method of claim 50 wherein the polyglycidyl resin comprises a mixture of diglycidyl ethers of bisphenol A.

52. The method of claim 49 wherein the polyglycidyl resin comprises a major amount by weight of diglycidyl ether having a weight average molecular weight of at least about 300 and a minor amount by weight of diglycidyl ether having a weight molecular weight average of less than about 250 such that the polyglycidyl resin has a viscosity of about 4,000 to 25,000 centipoises at 25° C.

53. The method of claim 52 wherein the higher molecular weight diglycidyl ether has a weight average molecular weight of about 300 to 600 and a viscosity of about 4,000 to 30,000 centipoises at 25° C.

54. The method of claim 52 wherein the lower molecular weight diglycidyl ether has a weight average molecular weight of about 200 to 250 and viscosity less than about 5000 centipoises at 25° C.

55. The method of claim 52 where the lower molecular weight diglycidyl ether comprises an alkyl diglycidyl ether where the alkyl group has from 4 to 7 carbon atoms.

56. The method of claim 52, 54 or 55 wherein the higher molecular weight diglycidyl ether is diglycidyl ether of bisphenol A.

57. The method of claim 52 wherein the lower molecular weight diglycidyl ether is less than about 30 weight percent of the polyglycidyl resin.

58. The method of claim 52 wherein the lower molecular weight diglycidyl ether is about 0.5 to 20 weight percent of the polyglycidyl resin.

59. The method of claim 37 in which the curing agent comprises a viscosity increasing agent, which reacts with glycidyl groups in the liquid resinous composition, in an amount sufficient to increase the viscosity of the liquid resinous composition to reduce the viscosity of the filler to settle, and a solidifying agent, which reacts more slowly with glycidyl groups in the liquid resinous composition than does the viscosity increasing agent, in an amount sufficient to solidfy the liquid resinous composition.

60. The method of claim 59 wherein the temperature of curing is increased at least about 5° C. to initiate reaction of the solidifying agent.

61. The method of claim 59 in which the viscosity increasing agent is in an amount sufficient to increase the viscosity of the liquid resinous composition to at least 50,000 centipoises at 50° C.

62. The method of claim 59 in which the viscosity increasing agent is in an amount less than about 40 mole percent of that required for complete reaction with glycidyl groups in the liquid resinous composition.

63. The method of claim 59 in which the viscosity increasing agent is in an amount of about 10 to 25 mole percent of that required for reaction with glycidyl groups in the liquid resinous composition.

64. The method of claim 63 in which the viscosity increasing agent comprises a polyamine, polyamide, or tertiary amine salt.

65. The method of claim 59 in which the solidifying agent comprises imidazole curing agent having the structure $$\begin{array}{c} R_3-C=\!\!=\!\!=N \\ \| \quad\quad \| \\ R_4-C \quad\ C-R_2 \\ \diagdown\ \diagup \\ N \\ | \\ R_1 \end{array}$$

wherein $R_1$ is hydrogen, alkyl of 1 to about 12 carbon atoms, lower acyl or mono or bicyclic aryl or aralkyl of 6 to about 15 carbon atoms and $R_2$, $R_3$ and $R_4$ are hydrogen, halogen, hydroxy, nitro, alkoxy of 1 to about 6 carbon atoms, alkyl of 1 to about 12 carbon atoms, lower acyl, or mono or bicyclic aryl or aralkyl of 6 to about 15 carbon atoms.

66. The method of claim 65 in which the imidazole curing agent comprises 2-ethyl-4-methylimidazole.

67. The method of claim 59 in which the solidifying agent comprises at least one of methylene dianiline and diphenyl amine.

68. The method of claim 59, 64, 65 or 67 in which the mole ratio of the viscosity increasing agent to solidifying agent is about 0.5:1 to 2:1.

69. The method of claim 59 or 65 in which the solidifying agent is catalytic and is employed in an amount of about 0.01 to 0.5 mole per mole of glycidyl group in the liquid resinous composition.

70. The method of claim 37, 52 or 59 wherein the viscosity of the liquid resinous composition at the temperature of casting is about 1,000 to 4,000 centipoises.

71. The method of claim 37, 52 or 59 in which the temperature of the resin is increased after solidification to achieve additional cross-linking.

* * * * *

UNITED STATES PATENT AND TRADEMARK OFFICE
CERTIFICATE OF CORRECTION

PATENT NO. : 4,323,454

DATED : April 6, 1982

INVENTOR(S) : Alfred K. Fritzsche, Harry P. Holladay, Maurice L. Woodcock

It is certified that error appears in the above—identified patent and that said Letters Patent is hereby corrected as shown below:

Column 9, line 64, delete "Other".

Column 10, line 15, delete "B".

Column 17, line 5, "crosslinking" should read --cross-linking--.

Column 20, line 53, "sulfonates" should read --sulfates--.

Column 24, line 12, "EXAMPLE" should read --EXAMPLES--.

Signed and Sealed this

Tenth Day of August 1982

[SEAL]

Attest:

Attesting Officer

GERALD J. MOSSINGHOFF

Commissioner of Patents and Trademarks